United States Patent [19]

Hayakawa et al.

[11] Patent Number: 4,753,136
[45] Date of Patent: Jun. 28, 1988

[54] HYDRAULIC CONTROL OF TRANSMISSION

[75] Inventors: Yoichi Hayakawa, Toyoake; Masao Kawai, Chiryu; Kagenori Fukumura, Toyota; Seiichi Nishikawa, Toyokawa, all of Japan

[73] Assignees: Aisin-Warner Limited, Anjo; Toyota Jidosha Kabushiki Kaisha, Toyota, both of Japan

[21] Appl. No.: 819,788

[22] Filed: Jan. 17, 1986

[30] Foreign Application Priority Data

Jan. 19, 1985 [JP] Japan .................................. 60-7788
Jan. 19, 1985 [JP] Japan .................................. 60-7783

[51] Int. Cl.⁴ ............................................ B60K 41/16
[52] U.S. Cl. .................................. 74/869; 188/347
[58] Field of Search ................. 74/869; 188/347, 348, 188/366, 365

[56] References Cited

U.S. PATENT DOCUMENTS

| | | | |
|---|---|---|---|
| 3,258,984 | 7/1966 | Searles | 74/869 |
| 3,296,884 | 1/1967 | Leonard | 74/869 |
| 3,378,111 | 4/1968 | Greer et al. | 188/347 |
| 3,633,439 | 1/1972 | Annis | 74/869 |
| 3,650,364 | 3/1972 | Laing | 188/347 |
| 3,958,423 | 5/1976 | Hayashida et al. | 188/347 |
| 4,474,084 | 10/1984 | Sugano et al. | 74/869 |
| 4,532,829 | 8/1985 | Sugano | 74/869 |

Primary Examiner—Dirk Wright
Attorney, Agent, or Firm—Spencer & Frank

[57] ABSTRACT

A fluid pressure actuator for a frictionally engaged unit of a vehicular transmission includes a first transmission and a second transmission coupled to the output side of the first transmission and provided with a speed step change mechanism which has a frictionally engaging element for engaging a rotary member to a fixed member in such a manner as to enable an optional disengagement between the rotary member and the fixed member. The fluid pressure actuator further has an annular cylinder for operating the frictionally engaging element and has an outer annular portion and an inner annular portion provided inside the outer annular portion coaxially therewith, an annular piston including an outer annular portion slidably fitted to the outer annular portion of the cylinder and an inner annular portion slidably fitted to the inner annular portion of the cylinder, an outer cylinder chamber defined by the outer annular portions of the cylinder and the piston, and an inner cylinder chamber defined by the inner annular portions of the cylinder and the piston and connected to the outer cylinder chamber through an orifice through which working oil is supplied to one of the cylinder chambers. A one-way valve is provided in one of the annular portions of the cylinder for causing external air to be drawn into the one oil chamber.

4 Claims, 14 Drawing Sheets

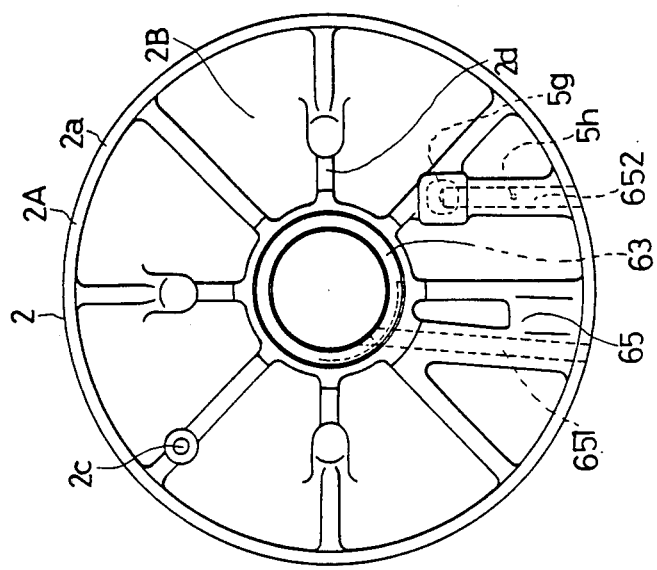
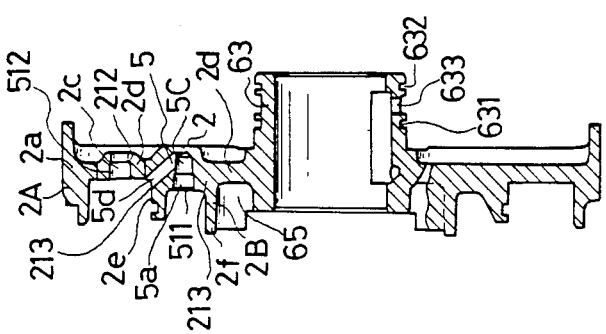
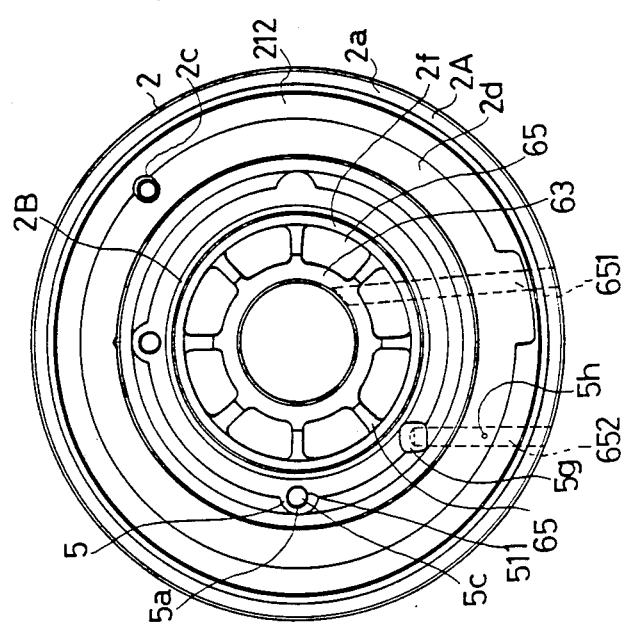

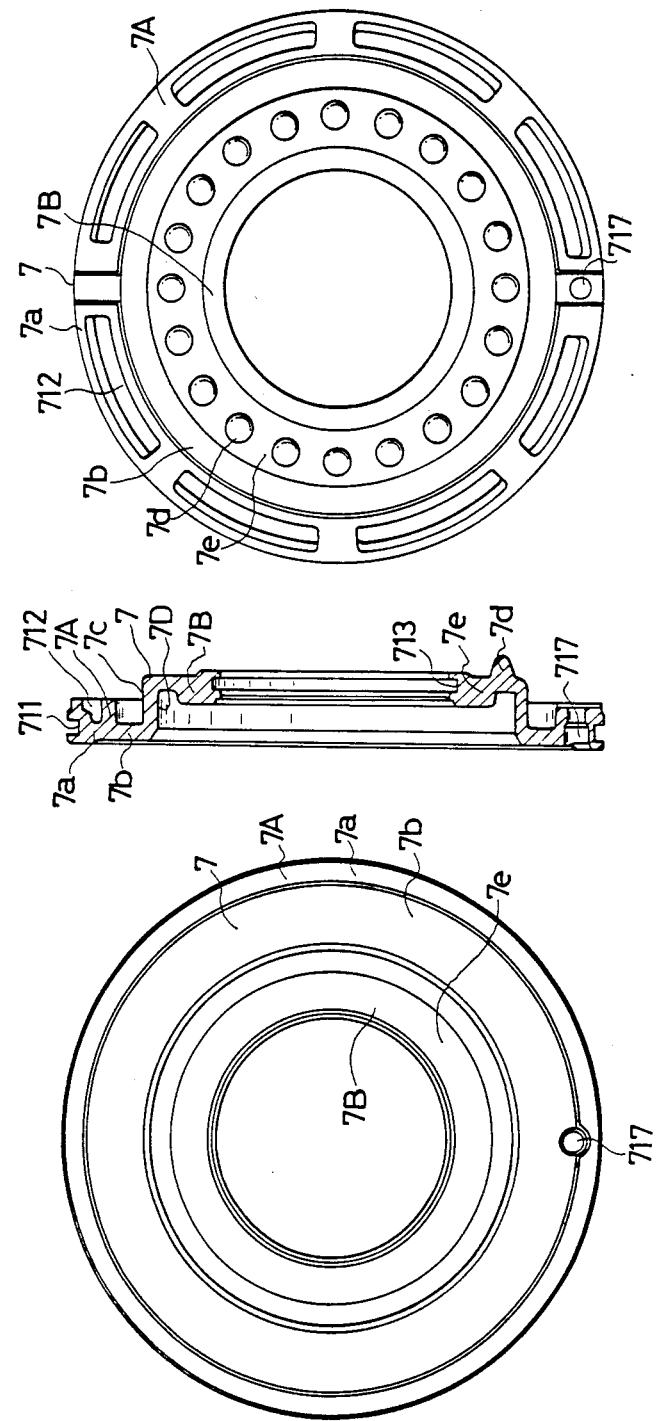

HYDRAULIC CONTROL OF TRANSMISSION

DETAILED DESCRIPTION OF THE INVENTION

1. Field of the Invention

The present invention relates to the hydraulic control of a transmission.

2. Description of the Prior Art

An automatic transmission, which is used for a vehicle or the like, comprises a gear transmission; multi-plate brakes which are frictionally engaged units for engaging members of the gear transmission with the case of the automatic transmission; hydraulic servo units for engaging the multi-plate brakes; and a hydraulic controller which selectively operates the hydraulic servo units depending on the set position of a manual lever, the speed of the vehicle, the load on an engine, etc. so as to attain a prescribed speed step. The hydraulic servo unit for the multi-plate brake, which is required of a high torque transmission capacity for attaining a large reduction ratio of speed, among the other multi-plate brakes, is effective particularly when the hydraulic servo unit comprises in combination a cylinder and a piston slidably fitted in the cylinder and having a large area for receiving the pressure of working oil.

First problem to be solved by the invention

It is necessary for such kind of hydraulic servo unit of a conventional automatic transmission that in order to increase the pressure-receiving area of the piston of the servo unit, the volume of the oil chamber thereof is made larger than that of the oil chamber of a hydraulic servo unit for a multi-plate brake for attaining a small reduction ratio of speed or a multi-plate brake required for a low torque transmission capacity. However, if the volume of the oil chamber is made larger, it takes working oil more time to fill the oil chamber after the supply of the oil thereto is started. For that reason, the action of the piston delays, so that the engagement of the multi-plate brake also delays. As a result, the timing of speed step change operation deteriorates when it is required to attain a large reduction ratio of speed or to have a high torque transmission capacity.

It can be presumed that in order to solve the above-mentioned problem, the diameter of a passage for supplying the working oil to the oil chamber is increased to augment the flow rate of the working oil to the oil chamber. However, it is likely in that case that a large amount of the working oil is supplied to the oil chamber to cause a sharp change in the torque transmission capacity of the multi-plate brake to produce an engagement shock.

It is the first object of the present invention to provide a hydraulic servo unit capable of quickly and smoothly engaging a brake.

Means for solving the first problem

According to the first present invention, a hydraulic servo unit for a brake comprises an annular cylinder having an outer annular portion and an inner annular portion provided inside the outer annular portion coaxially therewith; an annular piston which includes an outer annular portion slidably fitted to the outer annular portion of the cylinder and includes an inner annular portion slidably fitted to the inner annular portion of the cylinder; an outer oil chamber defined by the outer annular portion of the cylinder and the piston; and an inner oil chamber defined by the inner annular portions of the cylinder and the piston and connected to the outer oil chamber through an orifice through which working oil is supplied to one of the oil chambers.

According to the second present invention, a hydraulic servo unit for a brake comprises an annular cylinder having an outer annular cylinder and an inner annular cylinder provided inside the outer annular portion coaxially therewith; an annular piston which includes an outer annular portion slidably fitted to the outer annular portion of the cylinder and includes an inner annular portion fitted to the inner annular portion of the cylinder; an outer oil chamber defined by the outer annular portions of the cylinder and the piston; and an inner oil chamber defined by the inner annular portions of the cylinder and the piston and connected to the outer oil chamber through an orifice through which working oil is supplied to one of the oil chambers; the cylinder's outer or inner annular portion being provided with a one-way valve for causing external air to be sucked into said one of the oil chambers.

Operation, and effects of the invention

Because of the above-described constructions, each of the hydraulic servo units for the brakes has operation and effects as follows:

(a) Since the supply and discharge of the working oil to and from one of the oil chambers are performed through the other oil chamber, the brake can be quickly engaged because the piston is operated when the working oil has filled the other oil chamber.

(b) Since the working oil is supplied to said one of the oil chambers through the orifice, the torque transmission capacity is kept from sharply changing and can be slowly increased. In addition, the characteristics of the oil pressure which acts to said one of the oil chambers can be easily altered in terms of the size of the orifice.

Description of the prior art

In an automatic transmission which is used for a vehicle or the like and comprises a first transmission for three forward speed steps and one backward speed step and a second transmission connected to the output side of the first transmission and including a speed step change mechanism which functions independently of the first transmission, the speed step change mechanism includes plural frictionally engaged units such as a multi-plate clutch and a multi-plate brake for engaging some members of the speed step change mechanism with other members thereof or with the case of the automatic transmission, hydraulic servo units built as fluid pressure actuators for putting the frictionally engaged units into and out of engaged positions, and a hydraulic controller which selectively operates the hydraulic servo units depending on the set position of a manual lever, the speed of the vehicle, the load on an engine, etc. so as to attain a prescribed speed step. The multiple-disk clutch and the multi-plate brake of the speed step change mechanism receive a wide range of input torque for a low, a second and a third speed steps, from the first transmission. The hydraulic servo unit for each of the multi-plate clutch and the multi-plate brake, which are required of a high torque transmission capacity to attain a large reduction ratio of speed, among other multi-plate clutches and multi-plate brakes, is effective particularly when the hydraulic servo unit comprises in combination a cylinder and a piston slidably fitted in the cylinder and having a large area for receiving the pressure of working oil.

Second problem to be solved by the invention

It is necessary for such hydraulic servo unit of a conventional automatic transmission that in order to increase the pressure-receiving area of the piston, the volume of an oil chamber which is a chamber of the cylinder is made larger than that of the oil chamber of a hydraulic servo unit for a multi-plate clutch or a multi-plate brake which receives low input torque. However, if the volume of the oil chamber is made larger, it takes the working oil more time to fill the oil chamber after the supply of the oil thereto is started. For that reason, the action of the piston delays, so that the engagement of the multi-plate clutch or multi-plate brake also delays. As a result, the timing of speed step change operation deteriorates when it is required to attain a large reduction ratio of speed or have a high torque transmission capacity.

It can be presumed that in order to solve the above-mentioned problem, the diameter of a passage for supplying the working oil to the oil chamber is increased to augment the flow rate of the working oil to be supplied to the oil chamber. However, since the oil pressure Pa sharply rises from n1 to n2 as shown by a diagram (in the case that a pressure control unit such as an accumulator is not provided) in FIG. 24, a large amount of the working oil is supplied to the oil chamber so that the torque transmission capacity T2 sharply increases from m1 to m2 as shown by another diagram in FIG. 24. For that reason, it is likely that an engagement shock is caused by the sharp change in the torque transmission capacity of the multi-plate clutch or brake B4.

Unless a means such as a one-way clutch for mechanically setting a speed step change timing for shifting between a high speed step and a low speed step is provided in the automatic transmission including the speed step change mechanism of the above-described construction, a drain orifice and a speed step change timing valve which is for controlling the velocity of discharge of the oil from the hydraulic servo unit for attaining the low speed step by the input oil pressure to the other hydraulic servo unit for attaining the high speed step are provided in a passage for draining the oil from the former hydraulic servo unit and the diameter of the orifice and that of the land of the timing valve are adjusted so as to regulate the velocity of draining of the oil from the former hydraulic servo unit to control the timing of the engagement and disengagement of the frictionally engaged units at the time of the speed step change operation, conventionally. However, it is difficult to achieve the optimal timing. Since the oil pressure to the hydraulic servo unit for the high speed step is set to slowly rise from a relatively low level, by an accumulator or the like, in order to prevent the speed step change shock from being caused by the sharp increase in the torque transmission capacity of the frictionally engaged unit for the high speed step, as shown in FIG. 25 (pC3 denotes the oil pressure to the hydraulic servo unit for the high speed step; pB4 the oil pressure to the hydraulic servo unit for the low speed step; tC3 the torque transmission capacity of the frictionally engaged unit for the high speed step; and tB4 the torque transmission capacity of the frictionally engaged unit for the low speed step), when the speed step change operation is performed from the low speed step to the high speed step, the oil pressure to the hydraulic servo unit for the high speed step, which acts to the speed step change timing valve, is likely to become irregular. For that reason, the action of the speed step change timing valve is likely to become irregular. When the action of the speed step change timing valve delays, the disengagement (discharge of the oil pressure from the hydraulic servo unit for the low speed step by the valve) of the frictionally engaged unit for the low speed step also delays behind the start (Td) of the engagement of the frictionally engaged unit for the high speed step, so that the frictionally engaged units for the high and the low speed steps are both engaged, an output shaft is locked, the vehicle is sharply braked, and the feeling for the speed step change deteriorates. When the action of the speed step change timing valve is performed too early, the disengagement (the discharge of the oil pressure from the hydraulic servo unit for the low speed step by the valve) of the frictionally engaged unit for the low speed step is not effected before the start (Td) of the engagement of the frictionally engaged unit for the high speed step, so that neither of the frictionally engaged units for the high and the low speed steps is engaged. As a result, the rotational frequency of the engine increases. At that time, if the rotational frequency of the engine is high because of the large opening of throttle valve thereof, the engine rotates excessively.

It is an object of the present invention to provide such a fluid pressure actuator for a frictionally engaged unit as to prevent a speed step change shock from being caused in both a first transmission and a second transmission which is coupled to the output side of the first transmission and includes a speed step change mechanism which functions independently of the first transmission, and as to enable quick and smooth engagement.

Means for solving the second problem

The fluid pressure actuator, which embodies the present invention, is used for the frictionally engaged unit of a vehicular transmission comprising a first transmission and a second transmission which is coupled to the output side of the first transmission and includes a speed step change mechanism which functions independently of the first transmission. The speed step change mechanism comprises frictionally engaged members for coupling rotary members or fixed members to each other by engagement optionally changeable into disengagement, an annular cylinder which acts to operate the frictionally engaged members and which includes an outer annular portion and an inner annular portion provided inside the outer annular portion coaxially therewith, an annular piston which includes an outer annular portion slidably fitted to the outer annular portion of the cylinder and includes an inner annular portion slidably fitted to the inner annular portion of the cylinder, and the fluid pressure actuator which includes an outer cylinder chamber defined by the outer annular portions of the cylinder and the piston and includes an inner cylinder chamber defined by the inner annular portions of the cylinder and the piston. The outer and the inner cylinder chambers are connected to each other through an orifice. Working oil is supplied to one of the cylinder chambers through the orifice.

Operation, and effects of the invention

Because of the construction described above, the fluid pressure actuator embodying the present invention has operation and effects as described below.

FIG. 25 shows the characteristics PA and PB of the oil pressure in the cylinder chambers, and the torque transmission capacity T1 of frictionally engaged unit. Since the working oil is supplied to one of the cylinder chambers from the other through the orifice, the torque transmission capacity T1 can be slowly increased when the second transmission performs a speed step change action, so that the diagram indicating the capacity T1 in FIG. 25 is an ideal characteristic curve. For that reason, the speed change shock at the time of the speed step change action of the second transmission is reduced over a wide range of input torque from the first transmission.

Description of the prior art

In an automatic transmission which is used for a vehicle or the like, a speed step change mechanism comprises plural frictionally engaged units such as a multi-plate clutch and a multi-plate brake for engaging some members of the speed step change mechanism with other members thereof or with the case of the automatic transmission, hydraulic servo units built as fluid pressure actuators for engaging and disengaging the frictionally engaged units, and a hydraulic controller which selectively operates the hydraulic servo units depending on the set position of a manual lever, the speed of the vehicle, the load on an engine, etc. so as to attain a prescribed speed step. Each of the hydraulic servo units for the multi-plate clutch and the multi-plate brake, which are required of a high torque transmission capacity to attain a large reduction ratio of speed, among the other multi-plate clutches and brakes of the speed step change mechanism, is effective particularly when the hydraulic servo unit comprises in combination a cylinder and a piston slidably fitted in the cylinder and having a large area for receiving the pressure of working oil.

Third problem to be solved by the invention

When the pressure-receiving area of the piston of such a hydraulic servo unit as described above is to be increased, the volume of an oil chamber which is a cylinder chamber needs to be made larger than that of the oil chamber of the hydraulic servo unit for the multi-plate clutch or brake which receives low input torque. However, if the volume of the oil chamber is made larger, it takes the working oil more time to fill the oil chamber after the supply of the oil thereto is started. For that reason, the action of the piston delays, so that the engagement of the multi-plate clutch or brake also delays. As a result, the timing of speed step change deteriorates when it is required to attain a large reduction ratio of speed or have a high torque transmission capacity.

It can be presumed that in order to solve the above-mentioned problem, the diameter of a passage for supplying the working oil to the oil chamber is increased to augment the flow rate of the working oil to be supplied to the oil chamber. However, since the oil pressure Pa sharply rises from n1 to n2, as shown by a diagram (in the case that a pressure control member such as an accumulator is not provided) in FIG. 24, a large amount of the working oil is supplied to the oil chamber so that the torque transmission capacity T2 sharply increases from m1 to m2, as shown by another diagram in FIG. 24. For that reason, it is likely that an engagement shock is caused by the sharp change in the torque transmission capacity of the multi-plate clutch or brake.

When an automatic transmission, which is used for a vehicle and includes a speed step change mechanism of the above-described construction, does not have a means such as a one-way clutch for mechanically setting a speed step change timing for shifting between a high speed step and a low speed step, it can be presumed that a hydraulic controller is made of "A change controller (disclosed in Japan Patent Publication Gazette No. 48-21369) for an automatic transmission in which a low speed clutch in a low speed transmission line and a high speed clutch in a high speed transmission line are selectively connected to either an operating pressure fluid source or a drain line in response to the change motion of a shift valve, characterized in that a drain passage, which is connected to the low speed clutch, is opened through an orifice normally, but is directly opened not through the orifice when the pressure in the high speed clutch has become higher than a prescribed level." In that case, a drain orifice and a speed step change timing valve for controlling the speed of discharge of oil from the hydraulic servo unit for attaining the low speed step by the input oil pressure from the hydraulic servo unit for attaining the high speed step are provided in an oil drain passage for the hydraulic servo unit for the low speed step. The diameter of the orifice and that of the land of the speed step change timing valve are adjusted so as to regulate the speed of discharge of the oil from the hydraulic servo unit for the low speed step to control the timing of the engagement and disengagement of the frictionally engaged units at the time of speed step change. However, it is difficult to achieve the optimal timing. When the transmission is shifted from the low speed step to the high speed step, the oil pressure of the hydraulic servo unit for the high speed step is set, by an accumulator or the like, to slowly rise from a relatively low level, as shown in FIG. 25 (pC3 denotes the oil pressure of the hydraulic servo unit for the high speed step; pB4 the oil pressure of the hydraulic servo unit for the low speed step; tC3 the torque transmission capacity of the frictionally engaged unit for for the high speed step; and tB4 the torque transmission capacity of the frictionally engaged unit for the lower speed step), in order to prevent a speed change shock from being caused by a sharp increase in the torque transmission capacity of the frictionally engaged unit for the high speed step. For that reason, the oil pressure of the hydraulic servo unit for the high speed step, which acts to the speed step change timing valve, is likely to become irregular, so that the action of the valve is also likely to become irregular. When the action of the speed step change timing valve delays, the disengagement (the promotion of discharge of the oil pressure from the hydraulic servo unit for the low speed step by the valve) is begun before the start (Td) of the engagement of the frictionally engaged unit for the high speed step, so that the frictionally engaged units for the high and the low speed steps are both engaged, an output shaft is locked, the vehicle is sharply braked, and the feeling for speed step change deteriorates. When the action of the speed step change timing valve is performed too early, the disengagement (the promotion of the discharge of the oil pressure from the hydraulic servo unit for the low speed step by the valve) of the frictionally engaged unit for the low speed step is begun before the start (Td) of the engagement of the frictionally engaged unit for the high speed step, so that neither of the frictionally engaged units for the high and the low speed steps is engaged. As a result, the rotational frequency of the engine increases. At that time, if the rotational frequency of the engine is higher because of the large opening of throttle valve thereof, the engine rotates excessively.

It is the third object of the present invention to provide a hydraulic controller for a transmission for a vehicle, in which a speed step change shock is prevented and frictionally engaged units are quickly and smoothly engaged.

Means for solving the third problem

The hydraulic controller, which embodies the present invention and is used for a transmission for a vehicle, comprises an oil pressure source; a pressure control valve for regulating oil pressure supplied from the oil pressure source; a speed step change mechanism capable of selecting at least a high speed step and a low speed step; a frictionally engaged unit for the high speed step, which is engaged by a high speed step hydraulic servo unit for setting the speed step change mechanism into the high speed step, when the output oil pressure from the pressure control valve is applied to the frictionally engaged unit; and a frictionally engaged unit for the low speed step, which is engaged by a low speed step hydraulic servo unit for setting the speed step change mechanism into the low speed step, when the output oil pressure from the pressure control valve is applied to the frictionally engaged unit. In the hydraulic controller, the hydraulic servo unit for the high speed step includes a first cylinder chamber to which the output oil pressure from the pressure control valve is applied when the speed step change mechanism is set into the high speed step, and a second cylinder chamber which is connected to the first cylinder chamber through an oil passage provided with an orifice. The oil drain passage of the hydraulic servo unit for the low speed step is provided with a speed step change timing valve which functions to promote the discharge of oil pressure from the hydraulic servo unit for the low speed step in response to the rise in the oil pressure in the first cylinder chamber of the hydraulic servo unit for the high speed step.

Operation, and effects of the invention

Because of the above-described construction, the hydraulic controller, which embodies the present invention and is used for a transmission for a vehicle, has operation and effects described below.

The characteristics PA and PB of the rise in the oil pressure in the first cylinder chamber and the second cylinder chamber and the torque transmission capacity T1 of the frictionally engaged units are shown in FIG. 24. Since the working oil is supplied from the first cylinder chamber to the second cylinder chamber through the orifice, the torque transmission capacity T1 is slowly heightened when the speed step change mechanism performs a speed step change action, so that an ideal characteristic curve is attained for the torque transmission capacity T1. Since the range of the rise in the oil pressure which acts to the speed step change timing valve at the time of the speed step change action of the speed step change mechanism can be set to wide correspondingly to the torque transmission capacity of the frictionally engaged units in a wide range of input torque, the irregularity of the action of the speed step change timing valve can be diminished. Furthermore, the torque transmission capacity is little affected. As a result, the speed step change shock is decreased.

BRIEF DESCRIPTION OF THE DRAWINGS

FIG. 4 shows a front view of the input side of the annular cylinder of the hydraulic servo unit B-4 of a vehicular four-wheel-drive transmission in which the hydraulic controller of a vehicular transmission according to the present invention is adopted.

FIG. 5 shows a side view of the annular cylinder of the hydraulic servo unit B-4 of a vehicular four-wheel-drive transmission in which the hydraulic controller of a vehicular transmission according to the present invention is adopted.

FIG. 6 shows a front view of the output side of the annular cylinder of the hydraulic servo unit B-4 of a vehicular four-wheel-drive transmission in which the hydraulic controller of a vehicular transmission according to the present invention is adopted.

FIG. 12 shows a front view of the input side of the annular piston of the hydraulic servo unit C-3 of a vehicular four-wheel-drive transmission in which the hydraulic controller of a vehicular transmission according to the present invention is adopted.

FIG. 13 shows a sectional side view of the annular piston of the hydraulic servo unit C-3 of a vehicular four-wheel-drive transmission in which the hydraulic controller of a vehicular transmission according to the present invention is adopted.

FIG. 14 shows a front view of the output side of the annular piston of the hydraulic servo unit C-3 of a vehicular four-wheel-drive transmission in which the hydraulic controller of a vehicular transmission according to the present invention is adopted.

DETAILED DESCRIPTION OF THE PREFERRED EMBODIMENT

Figure 1:
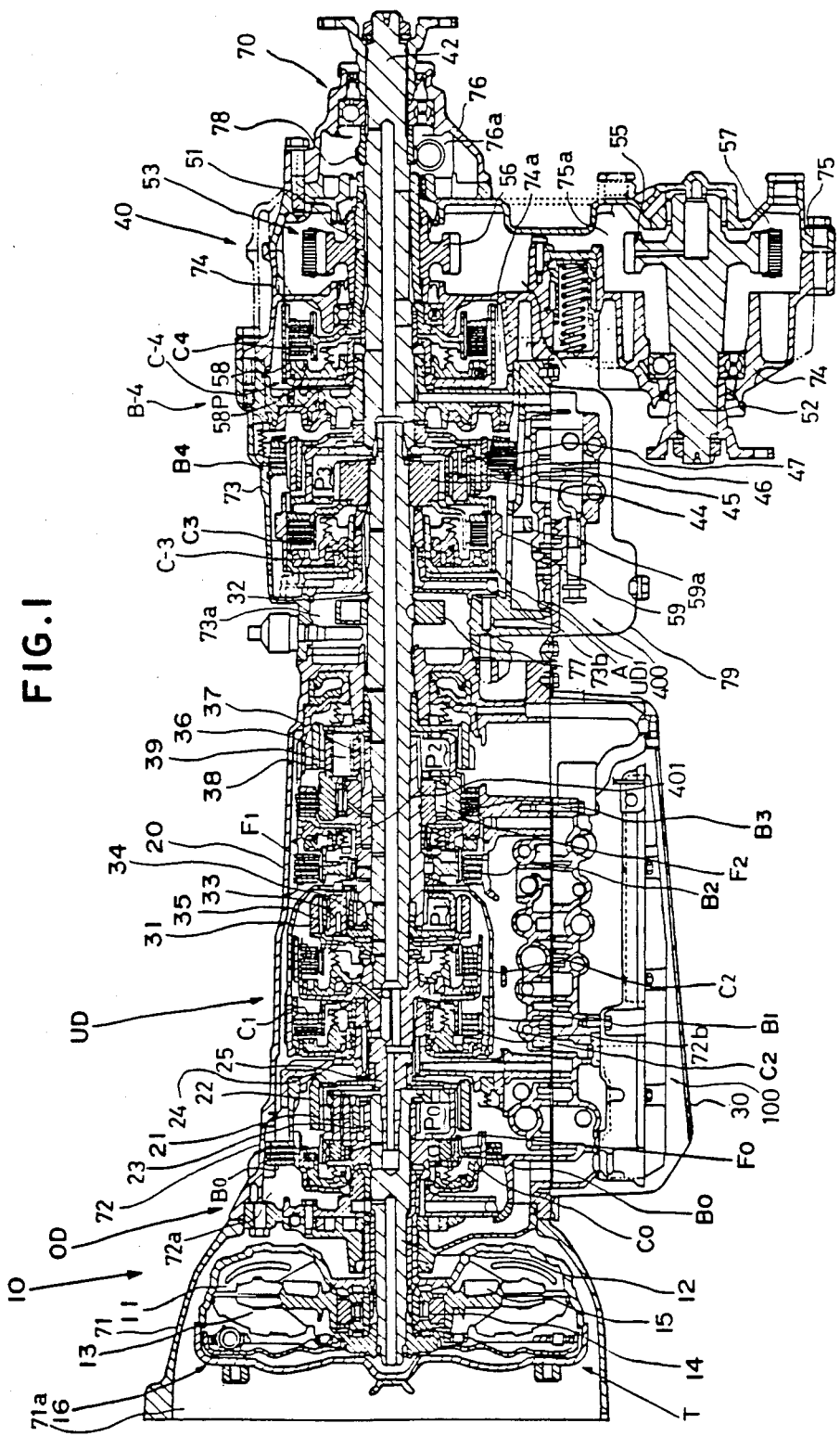
FIG. 1 shows a sectional view of a four-wheel-drive transmission for a vehicle.

The present invention is hereinafter described referring to a preferred embodiment shown in the drawings. The embodiment is applied to a four-wheel-drive transmission for a vehicle. The transmission comprises a four-speed automatic transmission 10, which has an overdrive and functions as a first transmission, a four-wheel-drive transfer device 40, which is coupled to the output shaft 32 of the four-speed automatic transmission 10 and functions as a second transmission, and a four-wheel-drive transmission case 70 housing the above-mentioned components, as shown in FIG. 1.

The transmission case 70 comprises a torque converter housing 71 defining a torque converter chamber 71a containing a torque converter T; a transmission case section 72 which defines an overdrive mechanism chamber 72a containing an overdrive mechanism OD and defines an underdrive mechanism chamber 72b containing an underdrive mechanism UD; an extension case 73 which defines an input side chamber 73a containing a vehicle speed sensor 77 of electronic control type and defines a speed step change mechanism chamber 73b containing a speed step change mechanism UD1; a front drive mechanism case 74 defining a changeover mechanism chamber 74a containing a clutch C4; a rear drive mechanism case 75 which defines together with the front drive mechanism case 74 a drive mechanism chamber 75a containing a drive mechanism 53; and an extension housing 76 which defines a rear chamber 76a containing a speedometer drive gear 78 and constitutes the rear lid of the four-wheel-drive transmission case 70.

Figure 2:
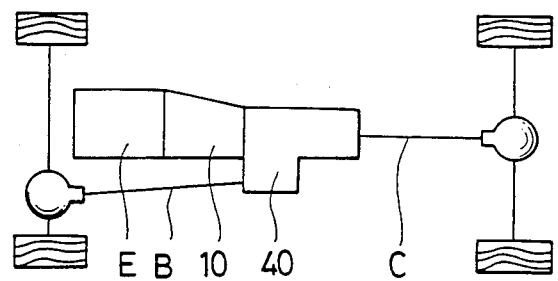
FIG. 2 shows a schematic of a four-wheel-drive vehicle.

The four-wheel-drive transfer device 40 is attached to the four-speed automatic transmission 10 coupled to an engine E, as shown in FIG. 2. A first output shaft 42 is coupled to a propeller shaft C driving the rear wheels of the vehicle. A second output shaft 52 is coupled to a propeller shaft B for driving the front wheels of the vehicle.

The four-speed automatic transmission 10 comprises the fluid torque converter T, the overdrive mechanism OD, and the underdrive mechanism UD for three forward speed steps and one backward speed step.

The torque converter T comprises a pump 11 coupled to the output shaft of the engine E, a turbine 13 coupled to the output shaft 12 of the torque converter T, a stator 15 coupled to a fixed portion through a one-way clutch 14, and a high gear clutch 16. The output shaft of the torque converter T also serves as the input shaft of the overdrive mechanism OD.

The overdrive mechanism OD comprises a multi-plate clutch Co, a multi-plate brake Bo and a one-way clutch Fo, which are frictionally engaged units, and comprises a planetary gear set Po, a member of which is fixed to a fixed member such as the transmission case section 72 or connected to an input shaft, an output shaft or another member or is unfixed or disconnected therefrom, depending on the selective engagement of the frictionally engaged units.

The planetary gear set Po comprises a carrier 21 coupled to the input shaft (12), a ring gear 22 coupled to the output shaft 25 of the overdrive mechanism OD, a sun gear 23 rotatably fitted on the input shaft (12) and secured to the transmission case section 72 through the brake Bo and couple to the carrier 21 through the clutch Co and the one-way clutch Fo disposed in parallel with the clutch Co, and a planetary pinion 24 rotatably supported by the carrier 21 and engaged with the sun gear 23 and the ring gear 22.

The output shaft 25 of the overdrive mechanism OD also serves as the input shaft of the underdrive mechanism UD for three forward speed steps and one backward speed step.

The underdrive mechanism UD comprises multi-plate clutches C1 and C2, which are frictionally engage units, a belt brake B1, multi-plate brakes B2 and B3, one-way clutches F1 and F2, a front-stage planetary gear set P1, and a rear-stage planetary gear set P2.

The front-stage planetary gear set P1 comprises a ring gear 31 coupled to the input shaft (25) through the clutch C1, a carrier 33 coupled to the output shaft 32 of the underdrive mechanism UD, a sun gear 34 which is coupled to the input shaft (25) through the clutch C2 and secured to the transmission case section 72 through the belt brake B1, the brake B2 disposed in parallel with the belt brake B1, and the one-way clutch F1 disposed in series with the brake B2, and a planetary pinion 35 rotatably supported by the carrier 33 and engaged with the sun gear 34 and the ring gear 31.

The rear-stage planetary gear set P2 comprises a carrier 36 which is secured to the transmission case section 72 through the brake B3 and the one-way clutch F2 disposed in parallel with the brake B3, a sun gear 37 integrally formed on a sun gear shaft 401 together with the sun gear 34 of the front-stage planetary gear set P1, a ring gear 38 coupled to the output shaft 32, and a planetary pinion 39 rotatably supported by the carrier 36 and engaged with the sun gear 37 and the ring gear 38.

The clutches and the brakes, which are frictionally engaged units, are selectively engaged or disengaged depending on such running conditions of the vehicle as the degree of opening of the throttle valve of the engine E, the speed of the vehicle and so forth, by a main hydraulic controller 100 provided at the lower portion of the four-speed automatic transmission 10 and housed in an oil sump 30, so that automatic speed step change for four forward speed steps including an overdrive step (O/D) or manual speed step change for one backward speed step is performed.

The transfer device 40 comprises a clutch C3 and a brake B4, which are frictionally engaged units, a clutch C4, which is a two-wheel/four-wheel drive changeover mechanism, an input shaft (32) which is also the ouput shaft 32 of the planetary gear sets P1 and P2, a first output shaft 42 disposed in series with the input shaft (32), a planetary gear set P3 provided between the input shaft (32) and the first output shaft 42, a four-wheel-drive sleeve 51 rotatably fitted on the first output shaft 42, a second output shaft juxtaposed in parallel with the input shaft (32) and attached in the opposite direction to the first output shaft 42, and a transmission mechanism 53 composed of the sleeve 51, the second output shaft 52 and other members.

The planetary gear set P3 comprises a sun gear 44 splinefitted on the end portion of the input shaft (32), a planetary pinion 45 engaged with the sun gear 44, a ring gear 46 engaged with the planetary pinion 45, and a carrier 47 supporting the planetary pinion 45 rotatably and coupled to the first end of the first output shaft 42 of the transfer device 40. The brake B4 is a multi-plate friction brake for engaging the ring gear 46 with the extension case 73. The brake B4 is operated by a hydraulic servo unit B-4 which is the hydraulic controller of the transmission for the vehicle, which is provided according to the present invention. The clutch C3 is disposed at the side of the planetary gear set P3 near the four-speed automatic transmission 10 so as to connect and disconnect the sun gear 44 and the carrier 47 to and from each other. The clutch C3 is operated by a hydraulic servo unit C-3. The planetary gear set P3, the brake B4 and the clutch C3 constitute the speed step change mechanism UD1.

Figure 3:
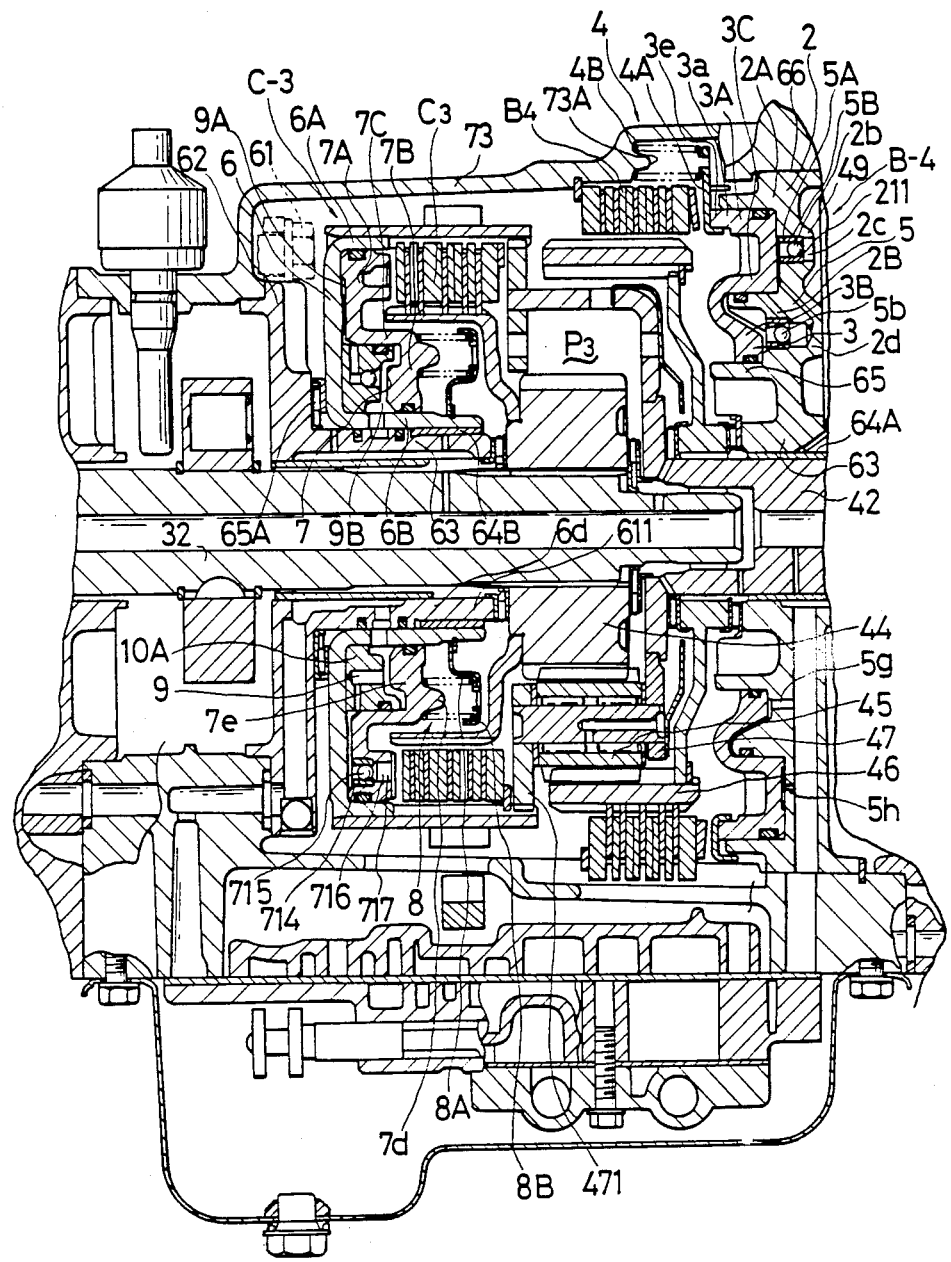
FIG. 3 shows an enlarged sectional view of the main part of a vehicular four-wheel-drive transmission in which the hydraulic controller of a vehicular transmission according to the present invention is adopted.
Figure 9:
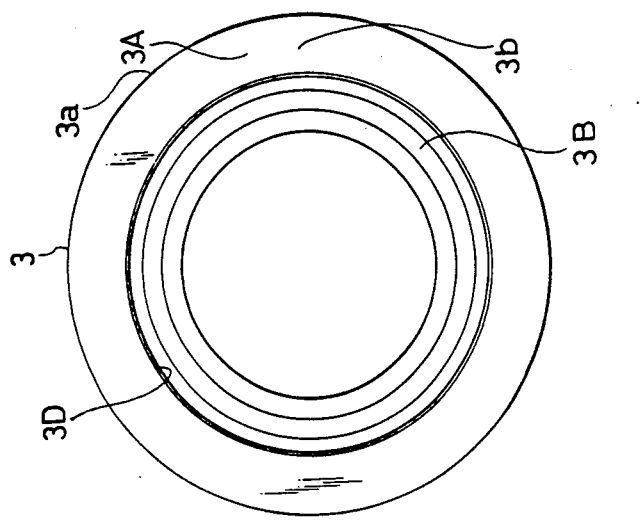
FIG. 9 shows a front view of the output side of the annular piston of the hydraulic servo unit B-4 of a vehicular four-wheel-drive transmission in which a fluid pressure actuator provided for frictionally engaged unit, according to the present invention, is adopted.
Figure 8:
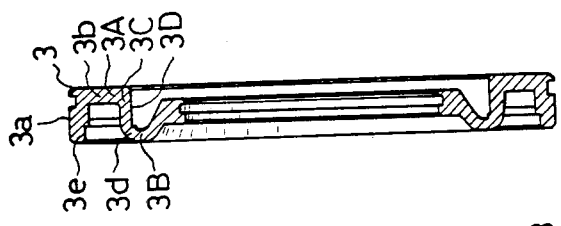
FIG. 8 shows a sectional side view of the annular piston of the hydraulic servo unit of a vehicular four-wheel-drive transmission in which the hydraulic controller of a vehicular transmission according to the present invention is adopted.

As shown in FIG. 3, the hydraulic servo unit B-4 comprises an annular cylinder 2 which is provided in an intermediate support wall 49 and has an outer annular portion 2A and an inner annular portion 2B disposed inside the outer annular portion 2A coaxially therewith and whose internal circumferential portion is used as a center support 63 for the first output shaft 42, an annular piston 3 having an outer annular portion 3A slidably fitted to the outer annular portion 2A of the cylinder 2, an inner annular portion 3B slidably fitted to the inner annular portion 2B of the cylinder, and an intermediate cylindrical portion 3C provided at the joint of the outer annular portion 3A and the inner annular portion 3B, an uring means 4 for returning the annular piston 3, an outer oil chamber 5A defined as an outer cylinder chamber by the outer annular portion 2A of the cylinder 2 and the outer annular portion 3A of the piston 3, and an inner oil chamber 5B defined as an inner cylinder chamber by the inner annular portion 2B of the cylinder and the inner annular portion 3B of the piston.

As shown in FIGS. 3, 4, 5, and 6, the annular cylinder 2 comprises the center support 63 which is located between the brake B4 and the clutch C4 and extends in contact with a bushing 64A press-fitted between the center support 63 and the first output shaft 42 to support the shaft 42 rotatably and whose external circumferential portion has ring grooves 631 and 632 and an oil passage 33 for supplying working oil to the hydraulic servo unit C-4 for the clutch C4, an annular plate $2d$ which extends radially outwards from the center support 63 and forms a cylindrical boss 65 and in which an oil passage 651 for supplying the working oil to the hydraulic servo unit C-4 for the clutch C4 and an oil passage 652 for supplying the working oil to the hydraulic servo unit B-4 for the brake B4 are provided, and a cylindrical fitted portion 66 provided on the external circumferential portion of the annular plate $2d$ and fixedly fitted on the internal circumferential surface 73A of the extension case 73.

Figure 10:
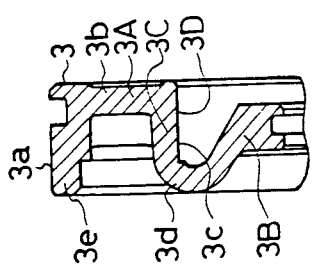
FIG. 10 shows an enlarged sectional side view of the annular piston of the hydraulic servo unit B-4 of a vehicular four-wheel-drive transmission in which the hydraulic controller of a vehicular transmission according to the present invention is adopted.
Figure 7:
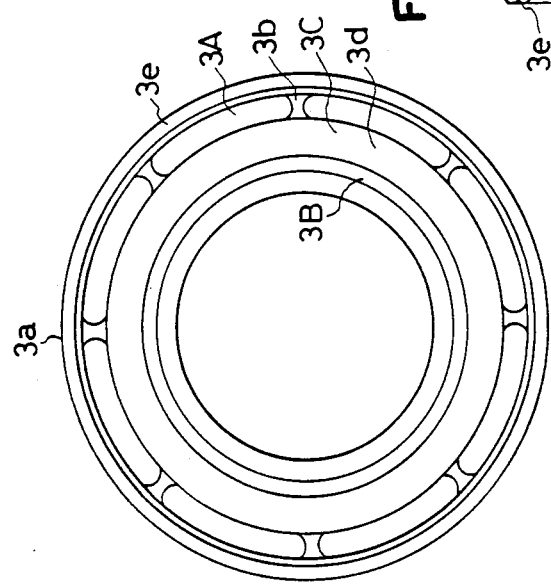
FIG. 7 shows a front view of the input side of the annular piston of the hydraulic servo unit B-4 of a vehicular four-wheel-drive transmission in which the hydraulic controller of a vehicular transmission according to the present invention is adopted.

As shown in FIGS. 4, 5, and 6, the outer annular portion 2A of the annular cylinder 2 comprises an outer cylindrical part $2a$, the external circumferential portion 212 of the annular plate $2d$ having an air suction hole $2c$ fitted with a check ball $2b$ (shown in FIG. 3) provided with a plug 211 having an orifice, and an intermediate cylindrical part $2e$ projecting from the annular plate $2d$ leftwards as to the drawing. The inner annular portion 2B of the cylinder 2 comprises the internal circumferential part 3D (shown in FIG. 10) of the intermediate cylindrical portion 3C of the annular piston 3, an intermediate cylindrical part $2e$, the internal circumferential portion 213 of the annular plate $2d$, and an internal cylindrical part $2f$.

As shown in FIGS. 7, 8, 9, and 10, the outer annular portion 3A of the annular piston 3 has an external circumferential part $3a$, which slides on the internal circumferential surface of the outer cylindrical portion $2a$ of the annular cylinder 2 and is coupled by a radially extending part $3b$ to the intermediate cylindrical portion 3C, which slides on the external circumferential surface of the inner cylindrical portion $2c$ of the annular cylinder 2. The inner annular portion 3B of the annular piston 3 has an internal circumferential part $3c$, which slides on the external circumferential surface of the inner cylindrical portion $2f$ of the annular cylinder 2 and is coupled to the intermediate cylindrical portion 3C by a part $3d$ having a round section.

The return urging means 4 comprises an annular spring retainer 4A secured to the front end $3e$ of the external circumferential portion $3a$ of the annular piston 3, and a return spring 4B interposed between the spring retainer 4A and the internal circumferential surface 73A of the extension case 73, as shown in FIGS. 3, 4, 5 and 6.

The annular plate $2d$ of the annular cylinder 2 is provided with an oil chamber communication passage 5, which connects the outer oil chamber 5A and the inner oil chamber 5B to each other to quickly discharge the oil pressure of the outer oil chamber 5A when the brake B4 is disengaged. The oil chamber communication passage 5 comprises an axial hole 5a having an opening 511 into the inner oil chamber 5B at the halfway part of the inner annular portion 2B of the cylinder 2, a plug 5b which is fitted with a check ball 5f and which is provided in axial hole 5a to close the hole when the working oil is supplied when the brake B4 is engaged, a hole 5c whose diameter is less than that of the axial hole 5a, and an oblique hole 5d having an opening 512 and extending from the hole 5c to the outer oil chamber 5A. The supply of the working oil to the outer oil chamber 5A and the inner oil chamber 5B is performed from a working oil supply passage 652 through an oil hole 5g and an orifice 5h whose diameter is less than that of the hole 5g. At that time, after the inner oil chamber 5B is filled with the working oil, the oil is supplied to the outer oil chamber 5A.

When the pressure of the working oil is applied to the inner oil chamber 5B, the annular piston 3 is quickly actuated so that the brake B4 is quickly engaged. At that time, since negative pressure is caused in the outer oil chamber 5A, air is sucked through a one-way valve 2c in order to smoothly actuate the piston 3. When the piston 3 is actuated to a prescribed position, the working oil is supplied to the outer oil chamber 5A through the orifice 5c so that the shock of the engagement of the brake B4 is reduced. The one-way valve 2c is closed when the pressure of the working oil has risen as the oil is supplied.

As shown in FIG. 3, the hydraulic servo unit C-3 is rotatably supported with a bushing 64B and a thrust bearing 65A on the center support 63, which serves for the input shaft (32) and is formed in a front support wall 62 whose inner portion is secured to the extension case 73 by bolts 61. The hydraulic servo unit C-3 comprises an annular cylinder 6 having an outer annular portion 6A and an inner annular portion 6B provided inside the outer annular portion 6A coaxially therewith, an annular piston 7 which includes an outer annular portion 7A slidably fitted to the outer annular portion 6A of the cylinder 6 and includes an inner annular portion 7B slidably fitted to the inner annular portion of the cylinder 6 and includes an intermediate cylindrical portion 7C provided at the joint of the outer and the inner annular portions 7A and 7B of the piston 7, an urging means 8 for returning the annular piston 7, an outer oil chamber 9A defined as an outer cylinder chamber by the outer annular portion 6A of the cylinder 6 and the outer annular portion 7A of the piston 7, and an inner oil chamber 9B defined as an inner cylinder chamber by the inner annular portion 6B of the cylinder and the inner annular portion 7B of the piston.

Figure 11:
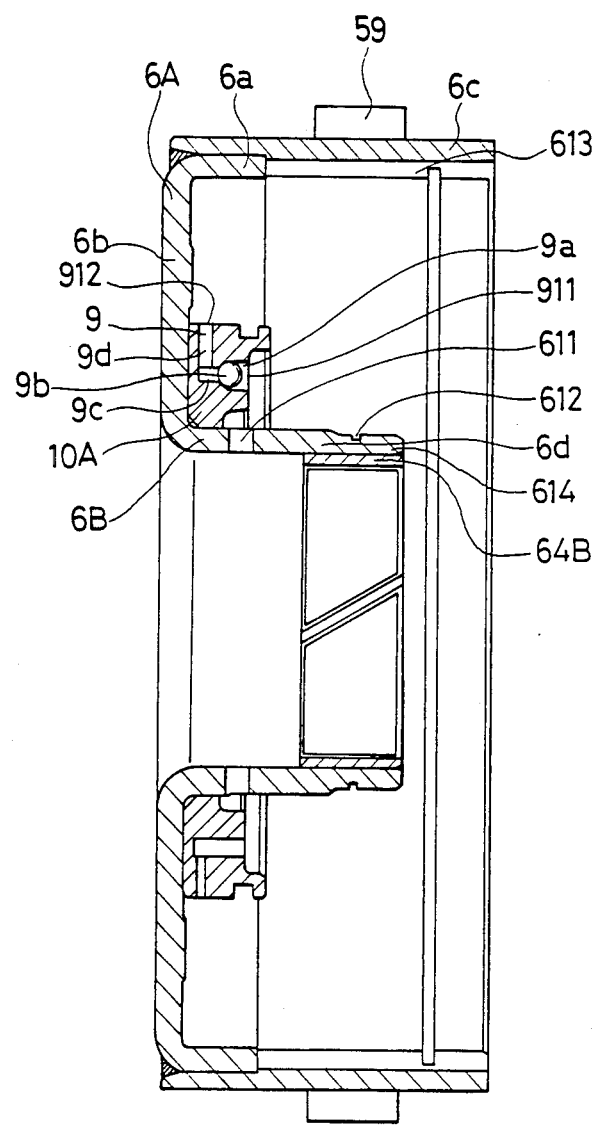
FIG. 11 shows a sectional side view of the annular cylinder of the hydraulic servo unit C-3 of a vehicular four-wheel-drive transmission in which the hydraulic controller of a vehicular transmission according to the present invention is adopted.
Figure 15:
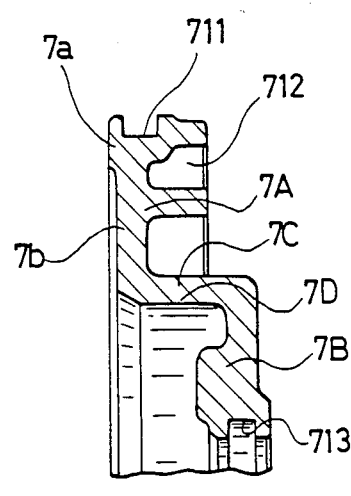
FIG. 15 shows an enlarged sectional side view of the upper part of the annular piston of the hydraulic servo unit C-3 of a vehicular four-wheel-drive transmission in which the hydraulic controller of a vehicular transmission according to the present invention is adopted.
Figure 16:
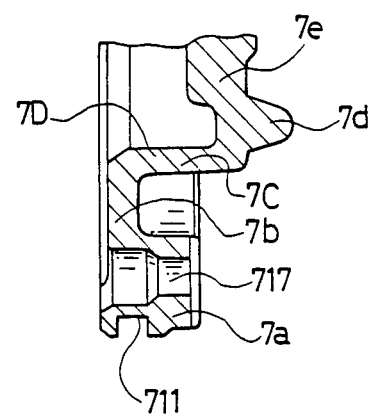
FIG. 16 shows an enlarged sectional side view of the lower part of the annular piston of the hydraulic servo unit C-3 of a vehicular four-wheel-drive transmission in which the hydraulic controller of a vehicular transmission according to the present invention is adopted.
Figure 17:
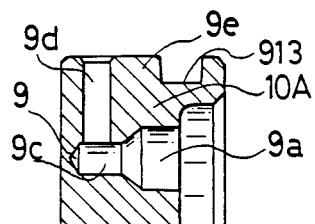
FIG. 17 shows an enlarged sectional side view of the upper part of the adapter cylinder of the hydraulic servo unit C-3 of a vehicular four-wheel-drive transmission in which the hydraulic controller of a vehicular transmission according to the present invention is adopted.
Figure 18:
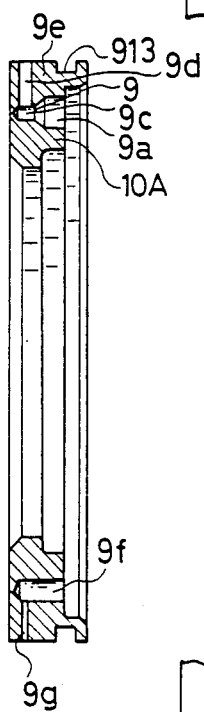
FIG. 18 shows a sectional side view of the adapter cylinder of the hydraulic servo unit C-3 of a vehicular four-wheel-drive transmission in which the hydraulic controller of a vehicular transmission according to the present invention is adopted.
Figure 19:
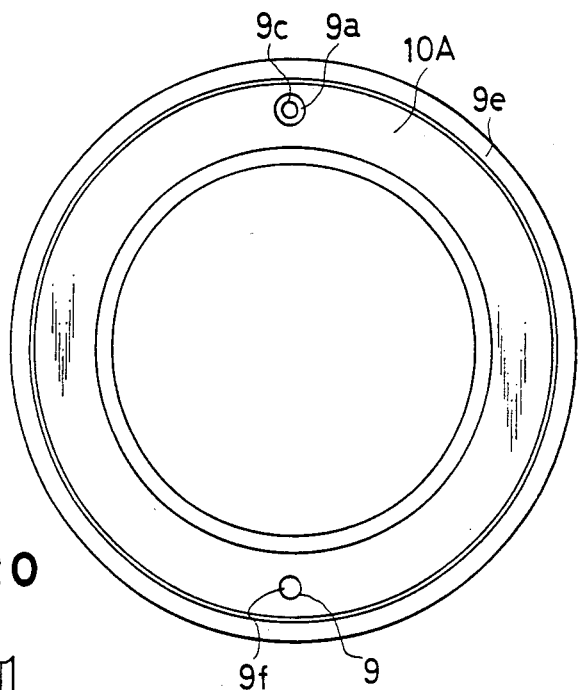
FIG. 19 shows a front view of the output side of the adapter cylinder of hydraulic servo unit C-3 of a vehicular four-wheel-drive transmission in which the hydraulic controller of a vehicular transmission according to the present invention is adopted.
Figure 20:
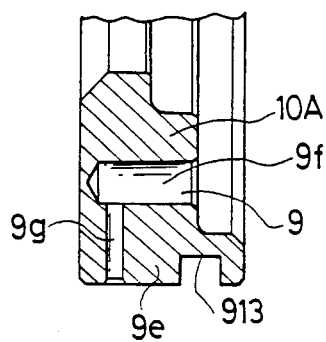
FIG. 20 shows an enlarged sectional side view of the lower part of the adapter cylinder of the hydraulic servo unit C-3 of a vehicular four-wheel-drive transmission in which the hydraulic controller of a vehicular transmission according to the present invention is adopted.

As for the annular cylinder 6, a parting gear 59 is provided on the circumferential surface of a coupling member 6c secured to an outer cylindrical part 6c provided with inner splines 613, which are fitted to the clutch C3 and the cover 471 of the carrier 47, as shown in FIG. 11. When the shifting lever of the four-speed automatic transmission 10 is put into a parting position, a pawl 59a (shown in FIG. 1) is engaged with the parking gear 59 so as to fix the first output shaft 42.

As shown in FIG. 11, the outer annular portion 6A of the annular cylinder 6 comprises an outer cylindrical part 6a, an annular plate 6b extending inwards from one end of the outer cylindrical portion 6a, and an adapter cylinder 10A press-fitted in a prescribed position on the annular plate 6b and an inner cylindrical portion 3d. The inner annular portion 6B of the cylinder 6 comprises the internal circumferential surface 7D of the intermediate cylindrical portion 7C of the annular piston 7, the adapter cylinder 10A, the annular plate 6b and an inner cylindrical part 6d provided with a ring groove 612 and an oil passage 611 for supplying the working oil to the inner oil chamber 9B of the hydraulic servo unit C-3 for the clutch C3.

As shown in FIGS. 12, 13, 14, 15 and 16, the outer annular portion 7A of the annular piston 7 has an external circumferential part 7a, which slides on the internal circumferential surface of the outer cylindrical part 6a of the annular cylinder 6 and has an O-ring groove 711 and a hole 712 open rightward as to the drawing. A radially extending part 7b couples the external circumferential part 7a to the intermediate cylindrical portion 7C, which slides on the external circumferential surface of the adapter cylinder 10A of the annular cylinder 6. The inner annular portion 7B of the piston 7 has an internal circumferential part 7c, which slides on the external circumferential surface of the inner cylindrical part 6d of the annular cylinder 6 and has an O-ring groove 713. A radially extending part 7e having a protrusion 7d couples the internal circumferential part 7c to the intermediate cylindrical portion 7C. The internal circumferential part 7c defines an oil passage 717 provided with a plug 714 having an orifice and with a check valve 716 made of a check ball 715.

A return urging means 8 comprises a spring retainer 8A which is an annular plate and secured to the front end 614 of the inner cylindrical part 6d of the annular cylinder 6, and a return spring 8B interposed between the spring retainer 8A and that side of the radially extending part 7e which faces the protrusion 7d, as shown in FIG. 3.

The adapter cylinder 10A is provided with oil chamber communication passages 9 for connecting the outer oil chamber 9A and the inner oil chamber 9B to each other, as shown in FIGS. 11, 17, 18, 19 and 20. One oil chamber communication passage 9 comprises an axial hole 9a having an opening 911 into the inner oil chamber 9B at the halfway part of the adapter cylinder 10A, a check ball 9b provided in the axial hole 9a, a radial orifice 9c whose diameter is less than that of the axial hole 9a, and a radial hole 9d having an opening 912 and extending from the radial orifice 9c to the outer oil chamber 9A. The other oil chamber communication passage 9 comprises an axial hole 9f, and a radial orifice 9g whose diameter is less than the axial hole 9f. The working oil is supplied to the outer oil chamber 9A through the oil chamber communication passages 9 after the inner oil chamber 9B is filled with the working oil. An O-ring groove 913 is provided on the external circumferential part 9e of the adapter cylinder 10A.

The clutch C4 is a multi-plate friction clutch, which functions so that the first output shaft 42 coupled to the carrier 47 and the sleeve 51 coupled to one sprocket 56 of the drive mechanism 53 for driving the output shaft 52 of the transfer device 40 are connected and disconnected to and from each other. The clutch C4 is operated by the hydraulic servo unit C-4 which comprises an annular cylinder 58 rotatably supported by the front drive mechanism 74 and comprises an annular piston 58P fitted in the annular cylinder 58.

The drive mechanism 53 comprises a first sprocket 56 as a first rotary member spline-coupled to the sleeve 51, a second sprocket 55 and a second rotary member integrally formed on the second output shaft 52, and a chain 57 as a drive member engaged with the sprockets 55 and 56.

For the normal movement of the vehicle, line pressure supplied to the hydraulic controller of the automatic transmission is applied to the hydraulic servo unit C-3 to engage the clutch C3, and pressure applied to the hydraulic servo units B-4 and C-4 is discharged therefrom to disengage the brake B4 and the clutch C4. As a result, the sum gear 44 and carrier 47 of the planetary gear set P3 are coupled to each other to transmit motive power from the input shaft (32) to the first output shaft 42 at a speed reduction ratio of 1 to perform that two-wheel drive of the vehicle, in which only the rear wheels thereof are driven. At that time, the motive power from the input shaft (32) is transmitted to the first output shaft 42 from the carrier 47 not through the sun gear 44, the planetary pinion 45 and the ring gear 46 but through the clutch C3, so that no load acts to the tooth surfaces of these gears. For that reason, the life of the gears lengthens.

When the four-wheel drive of the vehicle is to replace the two-wheel drive thereof, that shifting lever of the transfer device 40, which is provided as a speed step selector at the driver's seat or the like of the vehicle, is manually changed in the position, so that the line pressure is gradually applied to the hydraulic servo unit C-4 of a transfer controller 400 to smoothly engage the clutch C4. As a result, the first output shaft 42 and the sleeve 51 are coupled to each other so that motive power is also transmitted to the front wheels of the vehicle through the drive mechanism 53, the second output shaft 52 and the front wheel drive propeller shaft B (shown in FIG. 2). At that time, the motive power is transmitted from the input shaft (32) to the first output shaft 42 and the second output shaft 52 at a speed reduction ratio of 1. The four-wheel-drive high-gear movement (high-speed four-wheel drive) of the vehicle is thus effected. If the shifting lever is manually changed in the position when the output torque of the vehicle needs to be increased because of the vehicle being on a steep uphill during the four-wheel drive, the oil pressure to a hydraulic servo unit actuates a valve for replacing the high-speed four-wheel drive of the vehicle with the low-speed four-wheel drive thereof, so that the line pressure is gradually applied to the hydraulic servo unit B-4 and the oil pressure to the hydraulic servo unit C-3 is discharged therefrom, at an appropriate timing. As a result, the brake B4 is gradually engaged and the clutch C3 is smoothly disengaged. For that reason, the sun gear 44 and the carrier 47 are disconnected from each other, the ring gear 46 is fixed, and the motive power is transmitted from the input shaft (32) to the first output shaft 42 and the second output shaft 52 while the speed of motion caused by the motive power is being reduced through the sun gear 44, the planetary pinion 45 and the carrier 47, so that the vehicle undergoes a speed-reduction four-wheel drive (low-speed four-wheel drive) in which the output torque of the vehicle is high.

That shifting lever (not shown in the drawings) of the main transmission, which is provided at the driver's seat of the vehicle in order to operate the manual valve 210 of the main hydraulic controller 100 described below, has main shift positions (MSP) P (parking), R (reverse), N (neutral), D (drive), S (second) and L (low). TAB. 1 shows the relationship among the main shift positions (MSP), the fourth speed step (4), third speed step (3), second speed step (2) and first speed step (1) of the transmission, and the operation of the clutches and the brakes.

TABLE 1

| MSP | | S1 | S2 | S3 | C1 | C2 | C0 | B1 | B2 | B3 | B0 | F1 | F2 | F0 |
|---|---|---|---|---|---|---|---|---|---|---|---|---|---|---|
| P | | O | X | X | X | X | E | X | X | X | X | f | f | f |
| R | | O | X | X | X | E | E | X | X | E | X | f | f | f |
| N | | O | X | X | X | X | E | X | X | X | X | f | f | f |
| D | 1 | O | X | X | E | X | E | X | X | X | X | f | L | (L) |
|   | 2 | O | O | ⊚ | E | X | E | X | E | X | X | L | f | (L) |
|   | 3 | X | O | ⊚ | E | E | E | X | E | X | X | f | f | (L) |
|   | 4 | X | X | O | E | E | E | X | E | X | E | f | f | f |
| S | 1 | O | X | X | E | X | X | X | X | X | X | f | L | (L) |
|   | 2 | O | O | ⊚ | E | X | E | E | E | X | X | (L) | f | (L) |
|   | 3 | X | O | ⊚ | E | E | E | X | E | X | X | f | f | (L) |
|   | (3) | X | X | X | E | E | E | X | E | X | X | f | f | (L) |
| L | 1 | O | X | X | E | X | E | X | X | E | X | f | (L) | (L) |
|   | 2 | O | O | X | E | X | E | E | E | X | X | (L) | f | (L) |
|   | (1) | X | X | X | E | X | E | X | X | E | X | f | (L) | (L) |

Figure 21:
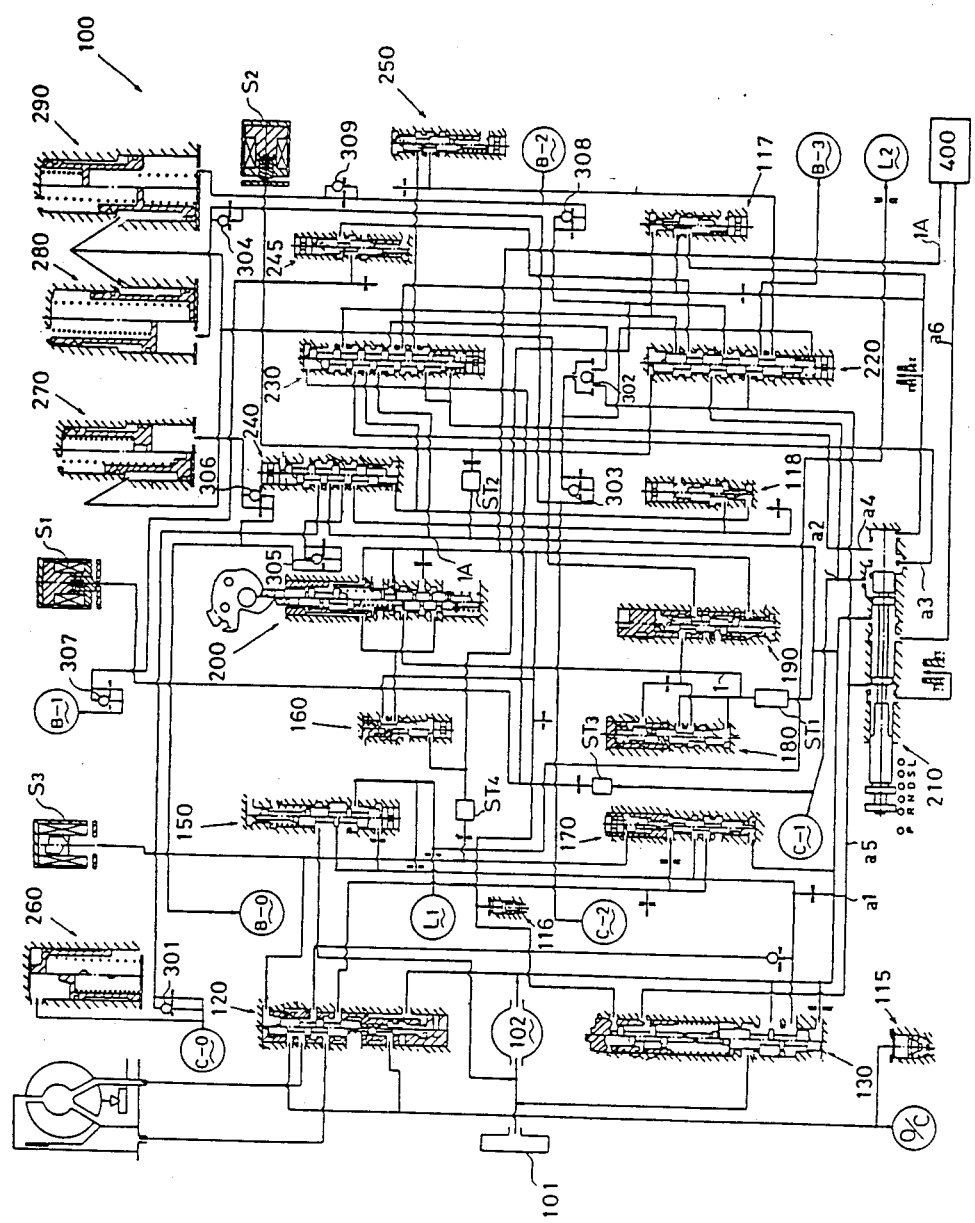
FIG. 21 shows the hydraulic circuit diagram of the main hydraulic controller of a vehicular four-wheel-drive transmission in which the hydraulic controller of a vehicular transmission according to the present invention is adopted.

As shown in FIG. 21, the main hydraulic controller 100 for the four-speed transmission 10 comprises an oil strainer 101, a hydraulic pump 102 for producing the line pressure, a cooler bypass valve 115, a pressure relief valve 116, a release clutch control valve 117, a release brake control valve 118, a lockup relay valve 120, a pressure control valve 130, a second pressure control valve 150, a cutback valve 160, a lockup control valve 170, a first accumulator control valve 180, a second accumulator control valve 190, a throttle valve 200, a manual valve 210, a 1-2 shift valve 220, a 2-3 shift valve 230, a 3-4 shift valve 240, an intermediate coast modulator valve 245 for controlling the oil pressure which is applied to the brake B1, a low coast modulator valve 250 for controlling the oil pressure which is applied to the hydraulic servo unit B-3, an accumulator 260 for smoothing the engagement of a clutch C0, an accumulator 270 for smoothing the engagement of the clutch C2, an accumulator 290 for smoothing the engagement of the brake B2, flow control valves 301, 303, 304, 305, 306, 307, 308 and 309 which have check valve elements and serve to control the flow rates of pressure oil which is supplied to the hydraulic servo units C-0, C-1 and C-2 for the clutch C0, C1 and C2 and the hydraulic servo units B-0, B-1, B-2 and B-3 for the brakes B0, B1, B2 and B3, a shuttle valve 302, a first solenoid valve S1 which is opened or closed by the output of an electronic controller (computer) so as to regulate the 2-3 shift valve 230, a second solenoid valve S2 for regulating both the 1-2 shift valve 220 and the 3-4 shift valve 240, a third solenoid valve S3 for regulating both the lockup relay valve 120 and the lockup control valve 170, and oil passages for connecting these valves to each other and for connecting the hydraulic cylinders of the clutches and the brakes to each other. Shown at ST1, ST2, ST3 and ST4 are oil strainers provided between the oil passages, respectively. Shown at L1 and L2 are lubricated oil passages. Shown at O/C is an oil cooler.

The working oil pumped up from an oil pressure source through the oil strainer 101 by the hydraulic pump 102 is regulated to a prescribed pressure (line pressure) by the pressure control valve 130 and then supplied into a line pressure output oil passage (simply referred to as oil passage below) 1. The pressure control valve 130 is regulated by a pressure (throttle pressure) corresponding to an engine torque request signal generated by the throttle valve 200, so that the pressure (line pressure) corresponding to the engine torque request signal is outputted.

That shifting lever (not shown in the drawings) of the transfer device 40, which is provided at the driver's seat of the vehicle in order to actuate a transfer manual valve 410, has auxiliary shift positions (SSP) H2 (two-wheel-drive high gear), H4 (four-wheel-drive high gear) and L4 (four-wheel-drive speed reduction). TAB. 2 shows the relationship among the auxiliary shift positions (SSP), the engagement and disengagement of the brake B4 and the clutches C3 and C4 and the state of movement of the vehicle.

TABLE 2

| SSP | S | C | B | C | State of movement |
|---|---|---|---|---|---|
| H2 | α | E | X | X | H2 |
| H4 | α | E | X | E | H4 |
|  | ○ | X | E | E | L4 |
| L4 | X | E | X | E | H4 |
|  | β | X | E | E | L4 |

In TABS. 1 and 2, ○ for the solenoid valves S1, S2 and S4 denotes the supply of electricity thereto; X for the solenoid valves S1, S2, S3 and S4 denotes the non-supply of electricity thereto; ⊙ denotes the state that lockup is caused if the solenoid valve C3 is supplied with electricity; α denotes the state that once the solenoid valve S4 is not supplied with electricity, the high gear movement of the vehicle is maintained even if the solenoid valve S4 is supplied with electricity again; β denotes the state that once the solenoid valve S4 is supplied with electricity, the speed-reduction movement of the vehicle is maintained even if the solenoid valve S4 is not supplied with electricity; E denotes the engagement of the corresponding clutch and brake; (L) denotes that though the corresponding one-way clutch is engaged under the driving action of the engine, the engagement is not necessarily needed (locking) because the transmission of motive power is assured by the clutch or brake disposed in parallel with the one-way clutch; L denotes that state that the corresponding one-way clutch is engaged only during the driving action of the engine and is not engaged during the braking action of the engine; and f denotes the state that the corresponding one-way clutch is free.

Figure 22:
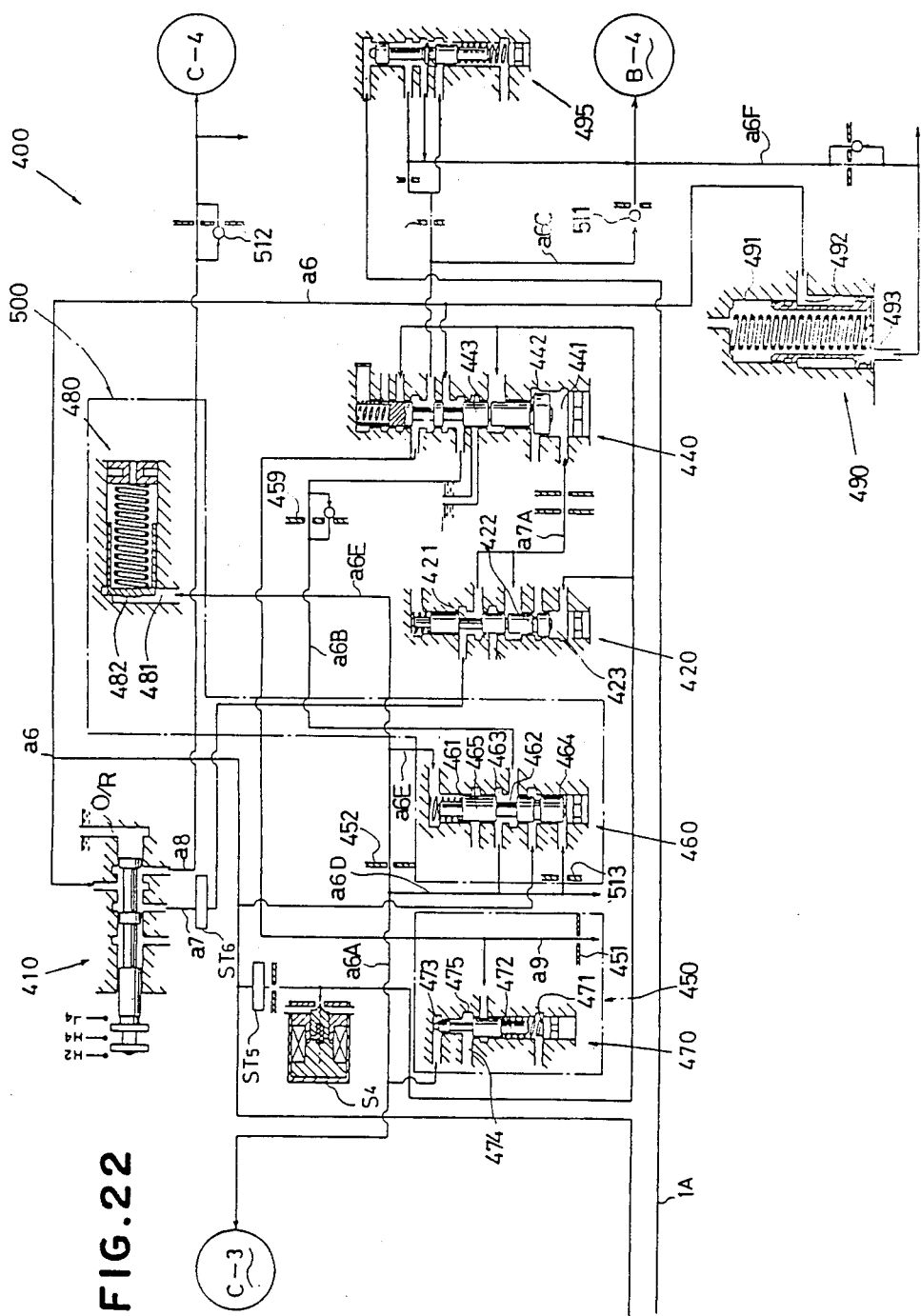
FIG. 22 shows the hydraulic circuit diagram of the auxiliary hydraulic controller of a vehicular four-wheel-drive transmission in which the hydraulic controller of a vehicular transmission according to the present invention is adopted.
Figure 23:
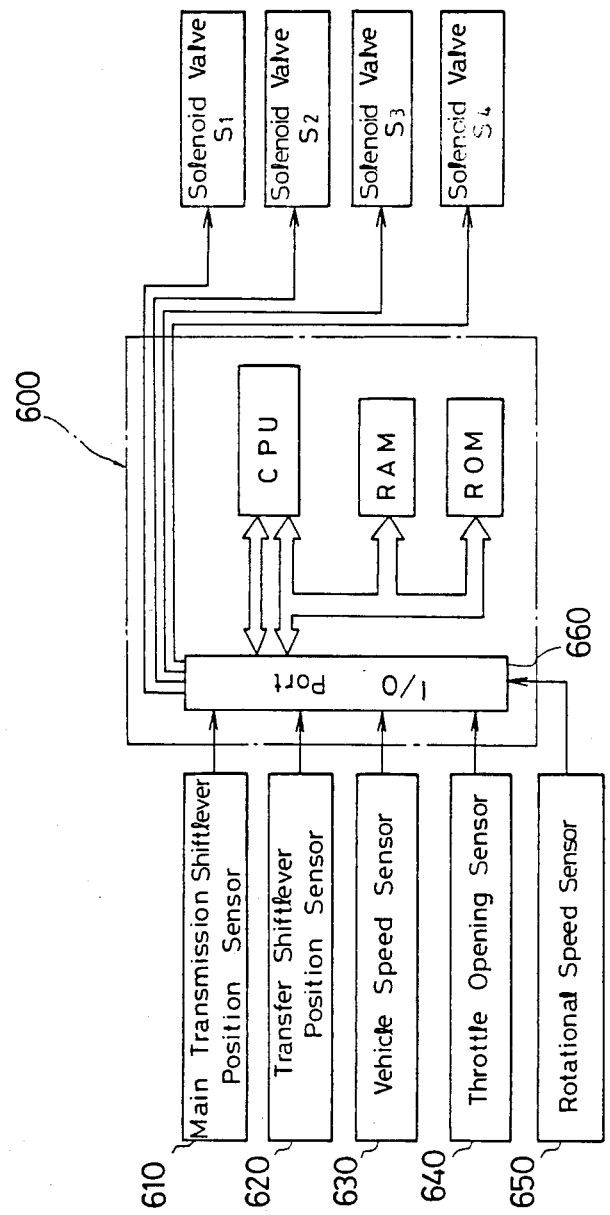
FIG. 23 shows the block diagram of an electronic controller.
Figure 24:
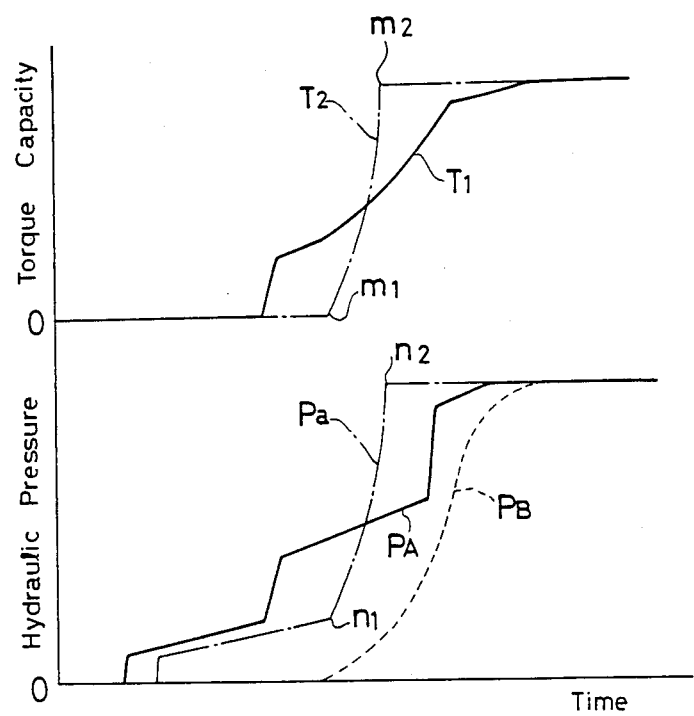
FIG. 24 shows diagrams indicating the changes in oil pressure and torque transmission capacity.

The transfer controller 400, which is the auxiliary oil pressure controller provided under the transfer device 40 for the four-wheel drive of the vehicle and housed in an oil sump 79, comprises a transfer manual valve 410 to which the line pressure to the transfer controller 400 is supplied from the oil passage a1 of the main oil pressure controller 100 through the manual valve 210 so that the line pressure supplied through an oil passage a6 is delivered to oil passages a7 and a8 by the operation of the shifting lever provided at the driver's seat of the vehicle, as shown in FIG. 22, and which serves as a means for selecting a speed step; a relay valve 420; an inhibitor valve 440; an accumulator 490 for smoothing the engagement of the brake B4; an orifice control valve 495 which communicates with the oil passage a1 through an oil passage 1A and serves to smooth the engagement of the brake B4; a speed step change timing mechanism 450 provided in the oil drain passage a9 of the hydraulic servo unit B-4 for the brake B4 so that the timing of pressure discharge from the hydraulic servo unit B-4 at the time of speed step change from L4 to H4 or from L4 to H2 and the timing of oil pressure supply to the hydraulic servo unit C-3 for the clutch C3 are related to each other; a shock reduction mechanism 500 for slowing down the rise in the line pressure in a passage a6A for supplying oil to the hydraulic servo unit C-3 for the clutch C3; the hydraulic servo units B-4 and C-4 for the brake B4 and the clutch C4; flow control valves 511 and 512 which have check valve elements and serve to control the flow rates of line pressure oil to be supplied; oil strainers ST5 and ST6; a fourth solenoid valve S4 which is opened or closed by the output of the electronic controller 600; a passage O/R for returning the oil to the four-speed automatic transmission 10; and oil passages for connecting these valves to each other and hydraulic cylinders for the clutches and the brakes to each other. The speed step change timing mechanism 450 comprises a drain orifice 451 provided in the oil drain passage a9, and a second step change timing valve 470.

The speed step change timing valve 470 has a spool 472 provided with a spring 471 on the rear of the spool. When the transfer device 40 is shifted to the vehicle movement state H2 or H4, the line pressure acts to an upper (as to the drawings) oil chamber 473 through the oil passage a6A so that the spool 472 is put into a lower (as to the drawings) position against the force of the spring 471, the oil drain passage a9 and a drain port 474 are connected to each other through an intermediate oil chamber 475, and the discharge of pressure from the hydraulic servo unit B-4 is promoted. When the manual valve 410 of the transfer device 40 is in a position for the vehicle movement state L4, the line pressure is discharged from the upper oil chamber 473 so that the spool 472 is put into an upper (as to the drawings) position.

The shock reduction mechanism 500 comprises a third accumulator control valve 460, and an accumulator 480 for smoothing the engagement of the clutch C3.

The third accumulator control valve 460 has a spool 462 provided with a spring 461 on the rear of the valve. When the transfer device 40 is shifted for the vehicle movement state H2 or H4, the spool 462 is displaced by the force of the spring 461 and the feedback of output oil pressure applied to a lower (as to the drawings) oil chamber 464 through an oil passage a6B, an intermediate oil chamber 463, an oil passage a6D and an orifice 513 so that the line pressure supplied through the a6B is regulated and then applied as output pressure to the oil passage a6D and then supplied to an accumulator chamber 482 to control the accumulation of pressure in the accumulator 480. Output oil pressure from the accumulator chamber 482 is fed back to an upper land 465 through an oil passage a6E. Since the diameter of 452 in the oil passage a6A extending to the accumulator 480 can be predetermined for the third accumulator control valve 460 in such a manner that the diameter is different from that of an orifice 459 for the hydraulic servo unit C-3, the action of the accumulator 480 can be set relatively freely.

When the vehicle movement state H2 or H4 is replaced by the other vehicle movement state L4, oil pressure delivered to the hydraulic servo unit B-4 through an oil passage a6C is applied to the accumulator chamber 493 of an accumulator 490 so that the engagement of the brake B4 is smoothed. The line pressure delivered through the oil passage a6 is supplied to a back pressure chamber through a back pressure port 492 to regulate the back pressure of the accumulator 490 to control the rising of the engaging oil pressure for the brake B4 depending on the degree of opening of engine throttle of the vehicle.

Figure 25:
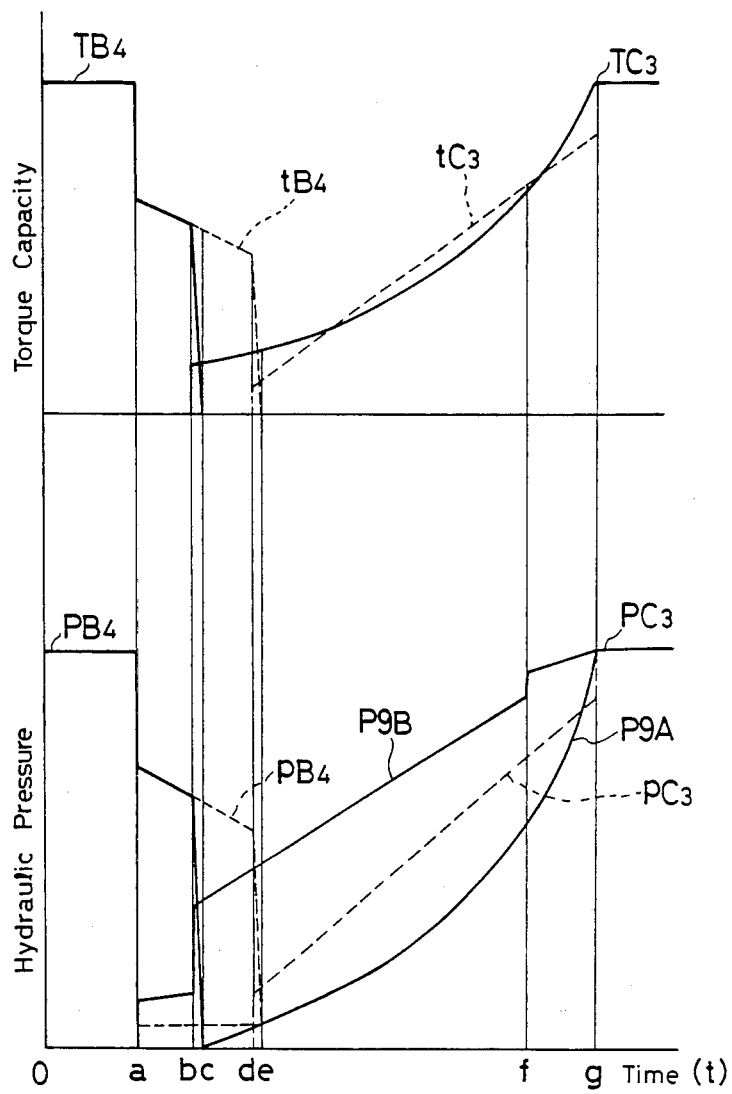
FIG 25 shows diagrams indicating the characteristics of servo unit pressure and output shaft torque at the time of from-low-to-high speed step change under the action of the hydraulic controller of an automatic transmission according to the present invention.

If the person driving the vehicle operates the shifting lever to the transfer device 40 from the position L4 to the other position H4 (at a point t0 shown in FIG. 25) in order to shift the transmission from the low speed step L4 to the high speed step H4 when the oil pressure (PB4) of the hydraulic servo unit B-4 for the brake B4 is equal to the line pressure, as shown by diagrams in FIG. 25 (PC3 denotes the oil pressure of the hydraulic servo unit for the clutch C3; P9A the oil pressure (outer oil chamber) of the hydraulic servo unit for the clutch C3; P9B the oil pressure (inner oil chamber) for the hydraulic servo unit for the clutch C3; PB4 the oil pressure of the hydraulic servo unit for the brake B4; TC3 the torque transmission capacity of the hydraulic servo unit for the clutch C3; and TB4 the torque transmission capacity of the hydraulic servo unit for the brake B4), namely, when the transmission is in the low speed step L4, oil passages a6 and a7 are connected to each other so that the spool 421 and plunger 422 of the relay valve 420 are put into upper positions (as to the drawings) because the fourth solenoid valve S4 is not supplied with electricity and solenoid pressure therefore acts to a lower oil chamber 423 as long as the transmission is in a speed step change permission area. As a result, oil passages a7 and a7A are connected to each other to apply the line pressure to the lower oil chamber 441 of the inhibitor valve 440 to put a plunger 442 and a spool 443 into upper positions (at a point ta shown in FIG. 25). At that time, the oil passage a6C and an oil pressure discharge passage a9 are connected to each other through the inhibitor valve 440 so as to generally discharge the oil pressure of the hydraulic servo unit B-4 through a drain orifice 451. The oil passages a6 and a6B are also connected to each other to apply the line pressure to the intermediate oil chamber 463 of the third accumulator control valve 460 to deliver the output oil pressure of the valve 460 to the accumulator 480 so that the accumulator starts acting (at a point tb shown in FIG. 25). At that time, oil pressure (shown by P9B in FIG. 25) acting to the inner oil chamber 9B of the hydraulic servo unit C-3 remains applied to the upper oil chamber 473 of the speed step change timing valve 470, the spool 472 is put into an upper (as to the drawings) position by the rise in the oil pressure acting to the inner oil chamber 9B of the hydraulic servo unit C-3, and a drain port 474 is thereby connected to the oil drain passage a9 through the intermediate oil chamber 475 to promote the discharge of pressure so as to disengage the brake B4 (at a point shown in FIG. 25). Since the pressure-receiving area of the inner annular portion 7B of the annular piston 7 is so small as to little affect the torque transmission capacity of the clutch C3, the quantity of the rise in the oil pressure which acts to the inner oil chamber 9B of the hydraulic servo unit C-3 can be set large enough, without causing the torque transmission capacity of the clutch C3 to be affected by the irregularity in the level of the oil pressure. Since the oil pressure of the brake B4 and the accumulator 490 is discharged through the drain orifice 451 between the points ta and td shown in FIG. 25, high pressure can be maintained by the reactionary force element (a spring or back pressure) of the accumulator for a long period of time so as to attain a sufficient torque transmission capacity and suppress the fluctuation therein. After the torque transmission capacity (TB4) drops at the point tc, the capacity rises until the point td. Since the disengagement of the brake B4 and the engagement of the clutch C3 at the point td are well timed to each other and the fluctuation in the torque transmission capacity is suppressed, the feeling of the driving person for the speed step change is improved. At a point te, the action of the accumulator 480 terminates and the oil pressure (PC3) of the hydraulic servo unit C-3 becomes equal to the line pressure.

TAB. 3 shows the connection and disconnection of the oil passage 1 to and from the oil passages a2~a6 in relation to the positions of the shifting lever of the main transmission. The manual valve 210 is coupled to the shifting lever provided at the driver's seat of the vehicle, so that the manual valve is manually put into one of positions P (parking), R (reverse), N (neutral), D (drive), S (second) and L (low) depending on the position of the shifting lever. TAB. 3 also shows the states of connection of the oil passage a1 to the oil passages a2~a6 in relation to the positions of the shifting lever. In TAB. 3, ○ denotes the case that the line pressure is applied through the connection of the oil passages, and X denotes the case that the line pressure is discharged.

TABLE 3

|  | P | R | N | D | S | L |
| --- | --- | --- | --- | --- | --- | --- |
| Oil passage a2 | X | X | X | ○ | ○ | ○ |
| Oil passage a3 | X | X | X | X | ○ | ○ |
| Oil passage a4 | X | X | X | X | X | ○ |
| Oil passage a5 | X | ○ | X | X | X | X |
| Oil passage a6 | X | ○ | ○ | ○ | ○ | ○ |

TAB. 4 shows the connection and disconnection of the oil passage a6 to and from the oil passages a7 and a8 in relation to the shifted positions of the auxiliary transmission. In TAB. 4, denotes the case that the line pressure is applied through the connection of the oil passages, and X denotes the case that the line pressure is discharged.

TABLE 4

|  | H2 | H4 | L4 |
| --- | --- | --- | --- |
| Oil passage a7 | ○ | ○ | X |
| Oil passage a8 | X | ○ | ○ |

The electronic controller 600, which regulates the supply of electricity to the solenoid valves S1~S4 of the hydraulic controller 100 and the transfer controller 400, comprises a main transmission shifting lever position sensor 610 for detecting the set position of the main transmission, a transfer shifting lever position sensor 620 for detecting the set position of the auxiliary transmission, a vehicle speed sensor 630 which converts into the speed of the vehicle a signal detected from the revolution speed of the output shaft of the auxiliary transmission, a throttle opening degree sensor 640 for detecting the operated quantity of the accelerator of the vehicle, the revolution speed sensor of a revolution speed detection means for detecting the revolution speed of the output shaft 32 of the four-speed automatic transmission, an I/O port 660 which functions to receive inputs from these sensors and send outputs to the solenoid valves S1~S4, a central processing unit CPU, a random-access memory RAM for performing speed step change point processing, and a read-only memory ROM in which data on a speed step change pattern including a speed step change point, a lockup point, etc. are stored.

We claim:

1. A fluid pressure actuator for a frictionally engaged unit of a vehicular transmission including a first transmission and a second transmission coupled to the output side of said first transmission and provided with a speed step change mechanism, the improvement wherein said speed step change mechanism comprises a frictionally engaging element for engaging a rotary member to a fixed member in such a manner as to enable the optional disengagement between said rotary member and said fixed member; and further wherein said fluid pressure actuator comprises an annular cylinder fixed to a case, having an outer annular portion, an intermediate cylindrical part, an inner annular portion and an annular plate connected to each of the annular portions and the cylindrical part;

an annular piston having an external circumferential portion slidably fitted to said outer annular portion of said cylinder, an intermediate cylinder portion slidably fitted to said intermediate cylindrical part of said cylinder and an inner annular portion slidably fitted to said inner annular portion of said cylinder;

an outer oil chamber defined by said outer annular portion, said intermediate cylindrical part and said annular plate of said cylinder, and said piston with external circumferential portion and intermediate cylindrical portion;

an inner oil chamber defined by said inner annular portion and said intermediate cylindrical part and said annular plate of said cylinder, and said piston with said intermediate cylindrical portion;

an orifice provided in said cylindrical to connect said outer oil chamber to said inner oil chamber; and a one-way valve provided in said cylinder for causing external air to be sucked into said one of the oil chambers therethrough.

2. A hydraulic controller for a vehicular transmission, comprising an oil pressure source;

a pressure control valve for regulating oil pressure supplied from said oil pressure source;

a speed step change mechanism capable of selecting at least a high speed step and a low speed step;

a high-speed-step hydraulic servo unit for setting said speed step change mechanism into said high speed step when the output oil pressure of said pressure control valve is applied thereto, having a first cylinder chamber to which the output oil pressure of said pressure control valve is applied when said speed step change mechanism is set into said high speed step, and a second cylinder chamber connected to said first cylinder chamber through an orifice;

a low-speed-step hydraulic servo unit for setting said speed step change mechanism into said low speed step when the output oil pressure of said pressure control valve is applied thereto;

a hydraulic servo, fixed to a case and having an outer annular portion, an intermediate cylindrical part, an inner annular portion and an annular plate connected to each of the annular portions and the cylindrical part;

an annular piston having an external circumferential portion slidably fitted to said outer annular portion of said cylinder, an intermediate cylinder portion slidably fitted to said intermediate cylindrical part of said cylinder and an inner annular portion slidably fitted to said inner annular portion of said cylinder;

an outer oil chamber defined by said outer annular portion, said intermediate cylindrical part and said annular plate of said cylinder, and said piston with external circumferential portion and intermediate cylindrical portion;

an inner oil chamber defined by said inner annular portion and said intermediate cylindrical part and said annular plate of said cylinder, and said piston with said intermediate cylindrical portion;

an orifice provided in said cylinder to connect said outer oil chamber to said inner oil chamber; and a one-way valve provided in said cylinder for causing external air to be sucked into said one of the oil chambers therethrough.

3. A hydraulic controller for a vehicular transmission as defined in claim 2, wherein said low-speed-step hydraulic sero unit comprises an annular cylinder for actuating said low-speed-step hydraulic servo, fixed to a case and having an outer annular portion, an intermediate cylindrical part, an inner annular portion and an annular plate connected to each of the annular portions and the cylindrical part;

an annular piston having an external circumferential portion slidably fitted to said outer annular portion of said cylinder, an intermediate cylinder portion slidably fitted to said intermediate cylindrical part of said cylinder and an inner annular portion slidably fitted to said inner annular portion of said cylinder;

an outer oil chamber defined by said outer annular portion, said intermediate cylindrical part and said annular plate of said cylinder, and said piston with external circumferential portion and intermediate cylindrical portion;

an inner oil chamber defined by said inner annular portion and said intermediate cylindrical part and said annular plate of said cylinder, and said piston with said intermediate cylindrical portion;

an orifice provided in said cylinder to connect said outer oil chamber to said inner oil chamber; and a one-way valve provided in said cylinder for causing external air to be sucked into said one of the oil chambers therethrough.

4. A hydraulic servo unit for a brake, comprising an annular cylinder fixed to a case, said annular cylinder having an outer annular portion, an intermediate cylindrical part, an inner annular portion and an annular plate connected to each of the annular portions and the cylindrical part;

an annular piston having an external circumferential portion slidably fitted to said outer annular portion of said cylinder, an intermediate cylinder portion slidably fitted to said intermediate cylindrical part of said cylinder and an inner annular portion slidably fitted to said inner annular portion of said cylinder;

an outer oil chamber defined by said outer annular portion, said intermediate cylindrical part and said annular plate of said cylinder, and said piston with external circumferential portion and intermediate cylindrical portion;

an inner oil chamber defined by said inner annular portion and said intermediate cylindrical part and said annular plate of said cylinder, and said piston with said intermediate cylindrical portion;

an orifice provided in said cylinder to connect said outer oil chamber to said inner oil chamber; and a one-way valve provided in said cylinder for causing external air to be sucked into said one of the oil chambers therethrough.

* * * * *